(12) United States Patent
Wang

(10) Patent No.: US 12,021,450 B2
(45) Date of Patent: Jun. 25, 2024

(54) POWER SUPPLY SYSTEM FOR SMART TOILET

(71) Applicant: Shanghai Kohler Electronics, Ltd., Shanghai (CN)

(72) Inventor: Yingfeng Wang, Shanghai (CN)

(73) Assignee: Shanghai Kohler Electronics, Ltd., Shanghai (CN)

( * ) Notice: Subject to any disclaimer, the term of this patent is extended or adjusted under 35 U.S.C. 154(b) by 0 days.

(21) Appl. No.: 18/086,567

(22) Filed: Dec. 21, 2022

(65) Prior Publication Data

US 2023/0208283 A1 Jun. 29, 2023

(30) Foreign Application Priority Data

Dec. 29, 2021 (CN) .......................... 202123382742.X

(51) Int. Cl.
*H02M 3/04* (2006.01)
*H02M 1/42* (2007.01)
(52) U.S. Cl.
CPC ........... *H02M 1/4208* (2013.01); *H02M 3/04* (2013.01)
(58) Field of Classification Search
None
See application file for complete search history.

(56) References Cited

U.S. PATENT DOCUMENTS

| 10,747,361 | B2 | 8/2020 | Wu et al. |
| 10,907,333 | B2* | 2/2021 | Matsuda ................... E03D 9/08 |
| 2010/0168926 | A1 | 7/2010 | Bayley et al. |

OTHER PUBLICATIONS

Extended European Search Report from European Patent Application No. 22216482.4, dated May 24, 2023, 7 pages.

* cited by examiner

*Primary Examiner* — Jeffrey S Zweizig
(74) *Attorney, Agent, or Firm* — Lempia Summerfield Katz LLC

(57) ABSTRACT

A power supply system for a toilet includes a controller power supply circuit, including an input end electrically connected to an external power supply and an output end. The system includes an assembly driving power supply circuit, including an input end electrically connected to the external power supply and an output end. The power supply system also includes a controller circuit, including a power supply end electrically connected to the output end of the controller power supply circuit and an output end communicably connected to a control end of a switch control circuit of the assembly driving power supply circuit. The system also includes a driving component circuit, including a power supply end electrically connected to the output end of the assembly driving power supply circuit. An output power of the controller power supply circuit is lower than an output power of the assembly driving power supply circuit.

20 Claims, 3 Drawing Sheets

POWER SUPPLY SYSTEM FOR SMART TOILET

CROSS REFERENCE TO RELATED APPLICATION

This application claims the benefit of priority to: Chinese Patent Application No. 202123382742.X filed in the Chinese Intellectual Property Office on Dec. 29, 2021, which is hereby incorporated by reference in its entirety.

FIELD

The present disclosure relates to the field of sanitary technologies, and particularly to a power supply system for a smart toilet.

BACKGROUND

In order to detect whether a person needs to use a smart toilet, the smart toilet needs to be supplied with a power all the time. Thus, this leads to a waste of power.

A group of switch power supplies are used in the smart toilet. In order to realize conservation of electricity, the smart toilet reduces power consumption of the switch power supplies when the smart toilet is not in use in the case of meeting the operating power requirement of the entire system.

However, the smart toilet needs to drive a high-power component and thus needs a high-power power supply. Thus, a power factor correction (PFC) circuit and a direct current to direct current (DC/DC) circuit are added. Therefore, power consumption is still high when the smart toilet is not in use.

SUMMARY

Based on the above technical problems, it is necessary to provide a power supply system for a smart toilet to address the technical problem of excessive power consumption when the smart toilet is not in use in the prior art.

The present disclosure provides a power supply system for a smart toilet. The power supply system comprises: a controller power supply circuit, an assembly driving power supply circuit, a controller circuit, and a driving component circuit. An input end of the controller power supply circuit is electrically connected to an external power supply. An input end of the assembly driving power supply circuit is electrically connected to the external power supply. An output end of the assembly driving power supply circuit is electrically connected to a power supply end of the driving component circuit. An output end of the controller power supply circuit is electrically connected to a power supply end of the controller circuit. An output end of the controller circuit is communicably coupled to a control end of a switch control circuit of the assembly driving power supply circuit. An output power of the controller power supply circuit is lower than an output power of the assembly driving power supply circuit.

Further, the controller power supply circuit comprises a first switch power supply circuit. The external power supply is electrically connected to an input end of the first switch power supply circuit. An output end of the first switch power supply circuit is electrically connected to the power supply end of the controller circuit.

Further, the assembly driving power supply circuit further comprises a second switch power supply circuit connected in series to the switch control circuit. An input end of the switch control circuit is electrically connected to the external power supply. An output end of the switch control circuit is electrically connected to an input end of the second switch power supply circuit. A first output end of the second switch power supply circuit is electrically connected to a first power supply end of the driving component circuit. An output voltage of the first output end of the second switch power supply circuit is higher than an output voltage of the first switch power supply circuit.

Further, the assembly driving power supply circuit further comprises a direct current to direct current circuit. An input end of the direct current to direct current circuit is electrically connected to a second output end of the second switch power supply circuit. An output end of the direct current to direct current circuit is electrically connected to a second power supply end of the driving component circuit. An output voltage of the output end of the direct current to direct current circuit is higher than the output voltage of the first switch power supply circuit.

Further, the assembly driving power supply circuit further comprises a power factor correction circuit connected in series between the second switch power supply circuit and the switch control circuit.

Further, the controller circuit comprises a controller. An input end of the controller is communicably connected to an external sensor and/or an external key (e.g., a button). An output end of the controller is communicably connected to the control end of the switch control circuit.

Further, the controller is a micro controller unit.

Further, the output end of the controller power supply circuit is electrically connected to a power supply end of the external sensor.

Further, the power supply system for the smart toilet further comprises a filter circuit. The input end of the controller power supply circuit is electrically connected to the external power supply through the filter circuit. The input end of the assembly driving power supply circuit is electrically connected to the external power supply through the filter circuit.

According to the present disclosure, by separating the controller power supply circuit from the assembly driving power supply circuit, when the smart toilet is not in use or is in a standby state, the output of the assembly driving power supply circuit is turned off, and only a controller power supply is maintained to supply power. Thus, an effect of energy consumption reduction may be achieved, and a service life of an assembly driving power supply may be prolonged.

DESCRIPTIONS OF REFERENCE NUMERALS

Figure 1:
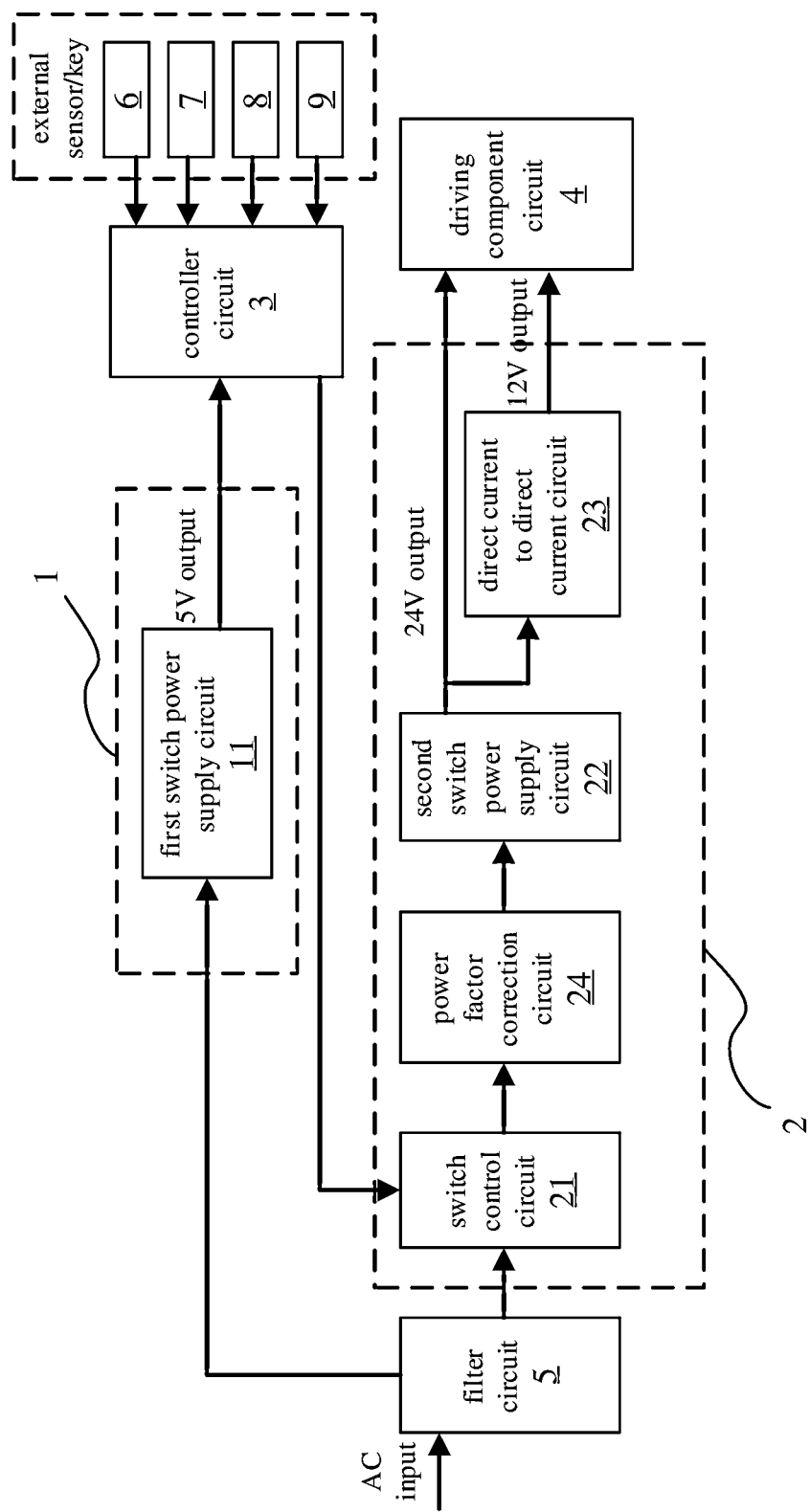
FIG. 1 is a system schematic diagram of a power supply system for a smart toilet according to the present disclosure.

1—a controller power supply circuit; 11—a first switch power supply circuit; 2—an assembly driving power supply circuit; 21—a switch control circuit; 22—a second switch power supply circuit; 23—a direct current to direct current circuit; 24—a power factor correction circuit; 3—a controller circuit; 4—a driving component circuit; 5—a filter circuit; 6—a human body proximity sensor; 7—a remote controller; 8—a human body sitting sensor; and 9—an auxiliary key (e.g., an auxiliary button).

DETAILED DESCRIPTION

The specific embodiments of the present disclosure are further described with reference to the drawings hereinafter. Same or equivalent parts are denoted by same reference numerals. It should be noted that the terms "front", "back", "left", "right", "up" and "down" used in the following description refer to the directions in the drawings, and the terms "inner" and "outer" refer to the directions towards or far away from geometric centers of specific parts respectively.

FIG. 1 is a system principle diagram of a power supply system for a smart toilet according to the present disclosure. The power supply system for the smart toilet comprises: a controller power supply circuit 1, an assembly driving power supply circuit 2, a controller circuit 3, and a driving component circuit 4. An input end of the controller power supply circuit 1 is electrically connected to an external power supply. An input end of the assembly driving power supply circuit 2 is electrically connected to the external power supply. An output end of the assembly driving power supply circuit 2 is electrically connected to a power supply end of the driving component circuit 4. An output end of the controller power supply circuit 1 is electrically connected to a power supply end of the controller circuit 3. An output end of the controller circuit 3 is communicably connected to a control end of a switch control circuit 21 of the assembly driving power supply circuit 2. An output power of the controller power supply circuit 1 is lower than an output power of the assembly driving power supply circuit 2.

Specifically, according to an embodiment of the present disclosure, an independent low-power controller power supply circuit 1 is added. For example, the controller power supply circuit 1 has a power of 1 W. The power of the controller power supply circuit 1 is used as a power supply of the controller circuit 3 to supply the power to a controller and auxiliary circuits of the controller. The power of the controller power supply circuit 1 is independent of the assembly driving power supply circuit 2 outputting a high-power power supply. The assembly driving power supply circuit 2 supplies the power to the driving component circuit 4 of the smart toilet. The driving component circuit 4 is a circuit of a driving component of the smart toilet.

The controller power supply circuit 1 and the assembly driving power supply circuit 2 are both electrically connected to the external power supply, and the external power supply may be an alternating current (AC) power supply.

Meanwhile, the switch control circuit 21 is added at a front end of the assembly driving power supply circuit 2. The switch control circuit 21 is turned on or off by a control signal output from the controller circuit 3. The turning on or off of the switch control circuit 21 enables or breaks the electrical connection between the assembly driving power supply circuit 2 and the external power supply. The controller circuit 3 determines whether a user is using the smart toilet according to a signal received from outside, e.g., from an external sensor. When there is no user, a corresponding control signal is output, such as a low level (or a high level), which controls the switch control circuit 21 to turn off. The turning off of the switch control circuit 21 breaks the electrical connection between the assembly driving power supply circuit 2 and the external power supply. When there is a user, a corresponding control signal is output, such as a high level (or a low level), which controls the switch control circuit 21 to turn on. The turning on of the switch control circuit 21 enables the electrical connection between the assembly driving power supply circuit 2 and the external power supply.

According to the present disclosure, by separating the controller power supply circuit from the assembly driving power supply circuit, when the smart toilet is not in use or is in a standby state, the output of the assembly driving power supply circuit is turned off, and only the controller power supply is maintained to supply power. Thus, an effect of energy consumption reduction may be achieved and a service life of the assembly driving power supply may be prolonged.

FIG. 1 shows a power supply system for a smart toilet according to an example of the present disclosure. The power supply system for the smart toilet comprises: a controller power supply circuit 1, an assembly driving power supply circuit 2, a controller circuit 3, a driving component circuit 4, and a filter circuit 5. An input end of the controller power supply circuit 1 is electrically connected to an external power supply. An input end of the assembly driving power supply circuit 2 is electrically connected to the external power supply. An output end of the assembly driving power supply circuit 2 is electrically connected to a power supply end of the driving component circuit 4. An output end of the controller power supply circuit 1 is electrically connected to a power supply end of the controller circuit 3. An output end of the controller circuit 3 is communicably connected to a control end of a switch control circuit 21 of the assembly driving power supply circuit 2. An output power of the controller power supply circuit 1 is lower than an output power of the assembly driving power supply circuit 2.

The controller power supply circuit 1 comprises a first switch power supply circuit 11. The external power supply is electrically connected to an input end of the first switch power supply circuit 11. An output end of the first switch power supply circuit 11 is electrically connected to the power supply end of the controller circuit 3.

The assembly driving power supply circuit 2 further comprises a second switch power supply circuit 22, a direct current to direct current circuit 23, and a power factor correction circuit 24, which are connected in series with the switch control circuit 21. An input end of the switch control circuit 21 is electrically connected to the external power supply. An output end of the switch control circuit 21 is electrically connected to an input end of the second switch power supply circuit 22. A first output end of the second switch power supply circuit 22 is electrically connected to a first power supply end of the driving component circuit 4. An output voltage of the first output end of the second switch power supply circuit 22 is higher than that of the first switch power supply circuit 11.

An input end of the direct current to direct current circuit 23 is electrically connected to a second output end of the second switch power supply circuit 22. An output end of the direct current to direct current circuit 23 is electrically connected to a second power supply end of the driving component circuit 4. An output voltage of the output end of the direct current to direct current circuit 23 is higher than that of the first switch power supply circuit 11.

The power factor correction circuit 24 is connected in series between the second switch power supply circuit 22 and the switch control circuit 21.

The controller circuit 3 comprises a controller. An input end of the controller is communicably connected to an external sensor and/or an external key (e.g., a button). An output end of the controller is communicably connected to the control end of the switch control circuit 21. The controller is a micro controller unit. The output end of the controller power supply circuit 1 is electrically connected to a power supply end of the external sensor.

The input end of the controller power supply circuit 1 is electrically connected to the external power supply through the filter circuit 5. The input end of the assembly driving power supply circuit 2 is electrically connected to the external power supply through the filter circuit 5.

Specifically, according to an embodiment of the present disclosure, an independent low-power controller power supply circuit 1 is added. The controller power supply circuit 1 comprises the first switch power supply circuit 11 that outputs a low voltage. The low voltage is used as a power supply of the controller circuit 3 to supply the low voltage to a controller and auxiliary circuits of the controller. The low voltage of the controller power supply circuit 1 is independent of the assembly driving power supply circuit 2 outputting a high-power power supply. For example, the first switch power supply circuit 11 outputs a voltage of 5V, with output power of 1 W. The assembly driving power supply circuit 2 supplies power to the driving component circuit 4 of the smart toilet. The driving component circuit 4 is a circuit of a driving component of the smart toilet.

Meanwhile, the switch control circuit 21 is added at a front end of the assembly driving power supply circuit 2. The switch control circuit 21 is turned on or off by a control signal output from the controller circuit 3. The turning on or off of the switch control circuit 21 enables or breaks the electrical connection between the assembly driving power supply circuit 2 and the external power supply. The controller circuit 3 determines whether a user is using the toilet according to a signal received from outside. When there is no user, a corresponding control signal is output, such as a low level (or a high level), which controls the switch control circuit 21 to turn off. The turning off of the switch control circuit 21 breaks the electrical connection between the assembly driving power supply circuit 2 and the external power supply. When there is a user, a corresponding control signal is output, such as a high level (or a low level), which controls the switch control circuit 21 to turn on. The turning on of the switch control circuit 21 enables the electrical connection between the assembly driving power supply circuit 2 and the external power supply.

The switch control circuit 21 may be implemented by a controllable switch, such as a triode or a field effect transistor. Taking the triode as an example, a collector and an emitter of the triode may be electrically connected to the external power supply and the second switch power supply circuit 22 respectively, and a base of the triode may be used as the control end of the switch control circuit 21 and is communicably connected to the output end of the controller circuit 3.

The assembly driving power supply circuit 2 comprises the second switch power supply circuit 22 that outputs a high voltage, and the second switch power supply circuit 22 supplies the high voltage, such as a voltage of 24V, to the driving component circuit 4. In addition, the second switch power supply circuit 22 is also electrically connected to the direct current to direct current (DC/DC) circuit 23 for voltage conversion. The direct current to direct current circuit 23 outputs a voltage higher than a voltage of the first switch power supply circuit 11, such as a voltage of 12V, to the driving component circuit 4.

The assembly driving power supply circuit 2 further comprises the power factor correction (PFC) circuit 24. The power factor correction circuit 24 is connected in series between the second switch power supply circuit 22 and the switch control circuit 21.

The controller power supply circuit 1 and the assembly driving power supply circuit 2 are both electrically connected to the external power supply. The external power supply may be an alternating current (AC) power supply. The external power supply is electrically connected to the input end of the controller power supply circuit 1 and the input end of the assembly driving power supply circuit 2 through the filter circuit 5 respectively.

The controller circuit 3 comprises a controller. The controller may be a micro controller unit (MCU). The controller receives an input signal of the external sensor and/or the external key. Whether there is a user can be determined according to the input signal of the external sensor and/or the external key. The determination of whether there is a user may be realized by a determination method.

The external sensor and/or the external key includes but is not limited to a human body proximity sensor 6, a remote controller 7, a human body sitting sensor 8, and an auxiliary key 9 (e.g., an auxiliary button).

Meanwhile, the controller power supply circuit 1 may also supply the power to the external sensor.

Figure 2:
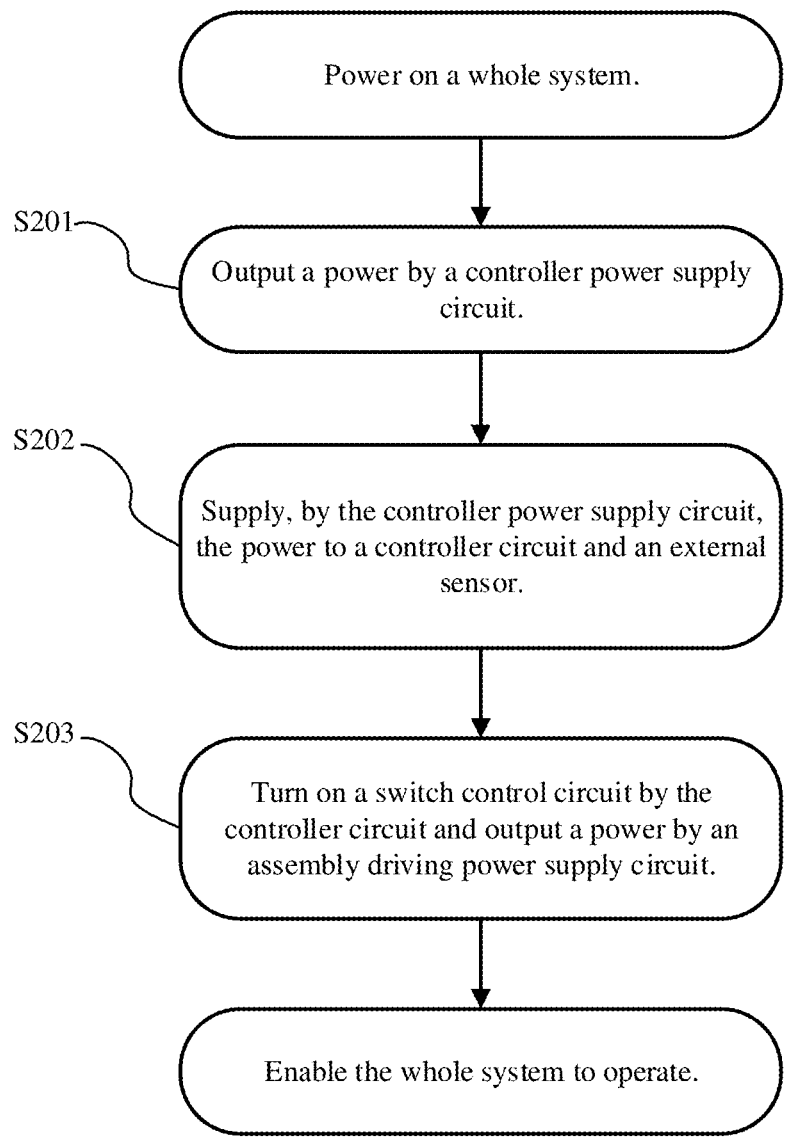
FIG. 2 is a flow chart of a method for supplying a power to a smart toilet by using the power supply system according to an example of the present disclosure.

FIG. 2 is a flow chart of a method for supplying a power to a smart toilet by using the power supply system according to an embodiment of the present disclosure. The power supply system used by the method may be the power supply system according to the above examples of the present disclosure and may be configured to perform an operation, function, or the like as described in the present disclosure. The method comprises the following acts.

At act S201, when a whole system is powered on, the controller power supply circuit 1 may be powered on to output a power supply of 5V. As noted above, the input end of the controller power supply circuit 1 is electrically connected to the external power supply. The output end of the first switch power supply circuit 11 is electrically connected to a power supply end of the controller circuit 3 to output a voltage of 5V.

At act S202, the controller power supply circuit 1 may supply the power to the controller circuit 3 and the external sensor so that the controller circuit 3 can be turned on, the external sensor can be powered on and started working. The external sensor comprises the human body proximity sensor 6, the remote controller 7, the human body sitting sensor 8, and the auxiliary key 9. As noted above, the controller circuit 3 comprises a controller. An input end of the controller is communicably connected to the human body proximity sensor 6, the remote controller 7, the human body sitting sensor 8, and the auxiliary key 9. The controller power supply circuit 1 may also supply the power to the external sensor.

At act S203, the controller circuit 3 may turn on the switch control circuit 21 and the assembly driving power supply circuit 2 may be powered on to provide power supplies of 24V and 12V, and so the whole system starts to operate. As noted above, the turning on or off of the switch control circuit 21 enables or breaks the electrical connection between the assembly driving power supply circuit 2 and the external power supply.

Specifically, when the controller power supply circuit 1 is powered on, the controller power supply circuit 1 supplies power to the controller circuit 3. The assembly driving power supply circuit 2 (with switch power supplies of 24V and 12V) is turned on by the controller circuit 3 through the switch control circuit 21. The controller power supply circuit 1 also supplies power to the sensor, such as supplying power to the human body proximity sensor 6, the remote controller 7, the human body sitting sensor 8, and the auxiliary key 9, and the whole system of the smart toilet enters a running state.

Figure 3:
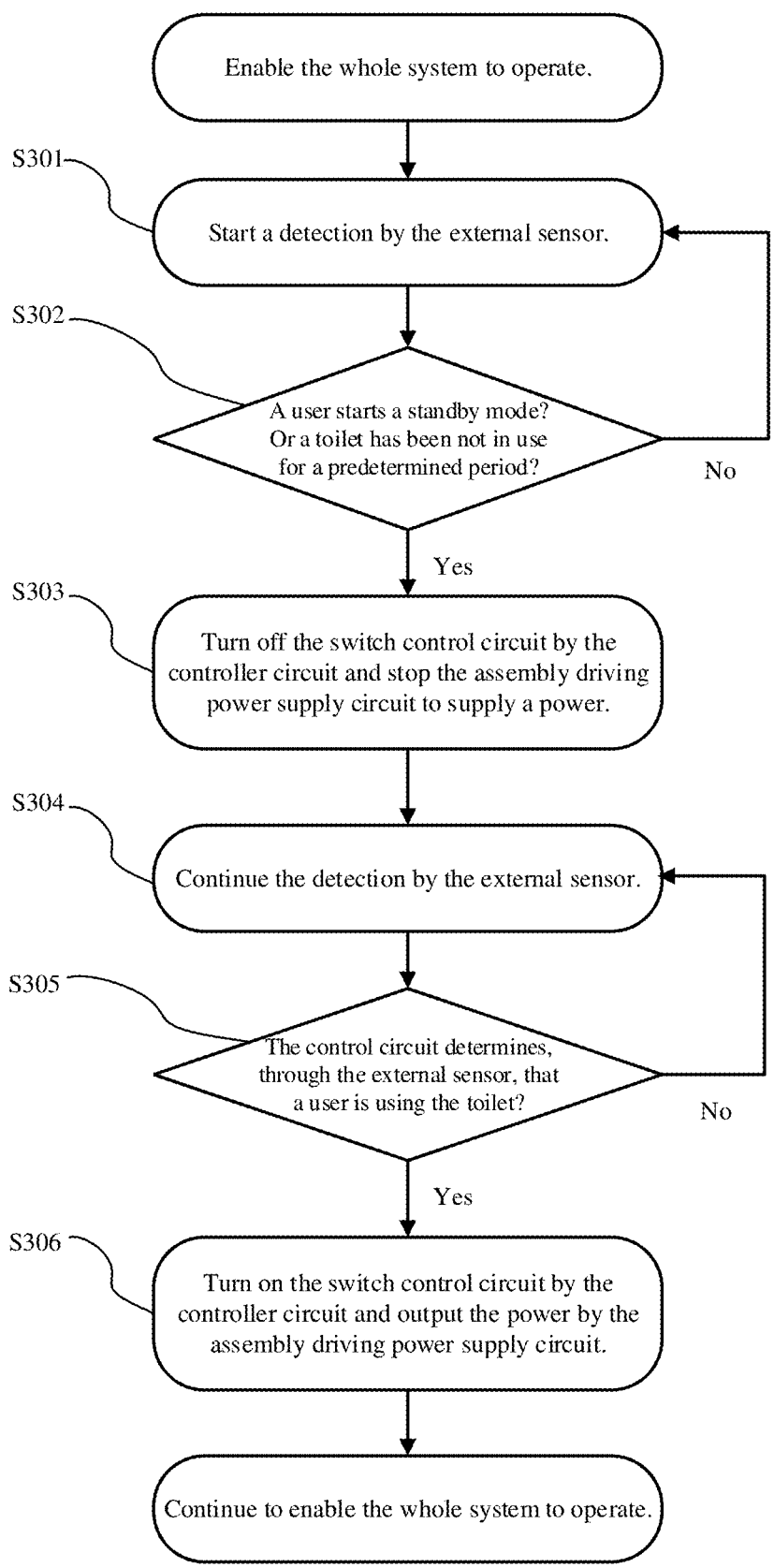
FIG. 3 is a flow chart of a method for suppling a power to a smart toilet by using the power supply system according to an example of the present disclosure.

FIG. 3 is a flow chart of a method for suppling a power to a smart toilet by using the power supply system according to an embodiment of the present disclosure. The power supply system used by the method may be the power supply system according to the above examples of the present disclosure and may be configured to perform an operation, function, or the like as described in the present disclosure. The method comprises the following acts.

At act S301, when the whole system runs or operates, a detection may be carried out by the external sensor. As noted above, the controller power supply circuit 1 may supply the power to the external sensor so that the external sensor can detect whether a user is using the toilet. For example, the human body proximity sensor 6 may detect a user when the user is present within a predetermined distance from the human body proximity sensor 6. The remote controller 7 may detect a command when the user presses a button on the remote controller 7. The human body sitting sensor 8 may detect the user when the user is sitting on a toilet seat. The auxiliary key 9 may detect a command when the user presses a button on a control panel of a toilet bidet.

At act S302, the controller circuit 3 may determine that the user starts a standby mode or that the toilet has been not in use for a predetermined period. The predetermined period may be 3 minutes. When the user starts a standby mode, or the smart toilet is not in use for more than 3 minutes, act S303 is executed. Otherwise, act S301 is executed continuously.

Specifically, as noted above, the controller circuit 3 may determine whether a user is using the toilet according to a signal received from the external sensor. For example, the controller circuit 3 may determine that the user starts the standby mode according to a signal received from the external sensor. The signal may indicate that the user presses a corresponding button on the remote controller 7 or the auxiliary key 9. The controller circuit 3 may determine that the toilet has been not in use for the predetermined period when the controller circuit 3 does not receive a signal from the external sensor. The signal not received by the controller circuit 3 may include a signal indicating that the human body proximity sensor 6 detects the user present within the predetermined distance, indicating that the remote controller 7 or the auxiliary key 9 receives the command, or indicating that the human body sitting sensor 8 detects the user sitting on the toilet seat.

At act S303, the controller circuit 3 may turn off the switch control circuit 21, and the assembly driving power supply circuit 2 may stop supplying the power. Specifically, when the controller of the controller circuit 3 detects that the smart toilet is not in use for 3 minutes or when the user starts a standby state, the assembly driving power supply circuit 2 is turned off by the controller circuit 3 through the switch control circuit 21.

As noted above, when there is no user, a corresponding control signal is output, such as a low level (or a high level), which controls the switch control circuit 21 to turn off. The turning off of the switch control circuit 21 breaks the electrical connection between the assembly driving power supply circuit 2 and the external power supply.

At act S304, the external sensor may continue the detection.

At act S305, the controller circuit 3 may determine through the external sensor whether a user is using the toilet. When the controller circuit detects through the external sensor that a user is using the toilet, act S306 is executed, otherwise act S304 is executed.

For example, the controller circuit 3 may determine that the user is using the toilet according to a signal received from the external sensor. The signal received by the controller circuit 3 may include a signal indicating that the human body proximity sensor 6 detects the user within the predetermined distance, indicating that the remote controller 7 or the auxiliary key 9 receives the command, or indicating that the human body sitting sensor 8 detects the user sitting on the toilet seat.

At act S306, the controller circuit 3 may turn on the switch control circuit 21, and the assembly driving power supply circuit 2 may output the switch power supplies of 24V and 12V.

Specifically, when the controller of the controller circuit 3 detects through the sensor that a user is using the smart toilet, the assembly driving power supply circuit 2 (with switch power supplies of 24V and 12V) is turned on through the switch control circuit 21.

As noted above, when there is a user, a corresponding control signal is output, such as a high level (or a low level), which controls the switch control circuit 21 to turn on. The turning on of the switch control circuit 21 enables the electrical connection between the assembly driving power supply circuit 2 and the external power supply.

The embodiment can reduce energy consumption of product, realize energy conservation and pollution reduction, and improve an energy efficiency level of product at the same time.

An embodiment of the present disclosure provides a toilet comprising the power supply system according to any embodiments as described above.

In an embodiment, the toilet includes a base (e.g., a pedestal, bowl, etc.) and a tank. The base is configured to be attached to another object such as a drainpipe, floor, or another suitable object. The base includes a bowl, a sump (e.g., a receptacle) disposed below the bowl, and a trapway fluidly connecting the bowl to a drainpipe or sewage line. The tank may be supported by the base, such as an upper surface of a rim. The tank may be integrally formed with the base as a single unitary body. In other embodiments, the tank may be formed separately from the base and coupled (e.g., attached, secured, fastened, connected, etc.) to the base. The toilet may further include a tank lid covering an opening and inner cavity in the tank. The toilet may include a seat assembly including a seat and a seat cover rotatably coupled to the base. The toilet may further include a hinge assembly.

In another embodiment, the toilet may be a tankless toilet. The toilet includes a base and a seat assembly coupled to the base. The base includes a bowl, a sump disposed below the bowl, and a trapway fluidly connecting the bowl to a drainpipe or sewage line. The toilet includes a waterline that supplies the toilet with water. The toilet may further include a seat assembly including a seat and a seat cover rotatably coupled to the base. The toilets described above are provided herein as non-limiting examples of toilets that may be configured to utilize aspects of the present disclosure.

In some examples, the bidet may be included in a seat or pedestal of a toilet. In other examples, the bidet may be manufactured separately from and attached or coupled to a seat or pedestal of a toilet. The bidet includes a housing. The housing is configured to receive a flow of water through a housing inlet and dispense the flow of water from a housing outlet. The housing inlet and housing outlet may be located on opposite ends of the housing from one another, such that water may flow through the housing from the housing inlet to the housing outlet. In some examples, the housing further includes a chamber. As the housing receives the flow of water, the chamber may fill with water and provide a flow of water between the housing inlet and the housing outlet. The chamber may be configured to contain the flow of water and direct the flow of water from the housing inlet to the housing outlet. After the chamber has filled with water, the flow of water may travel along a substantially linear path between the housing inlet and the housing outlet. In some examples, one or more walls within the housing may be included to help direct a flow of water between the housing inlet and the housing outlet. The bidet may further include a housing inlet conduit configured to direct a flow of water to the housing inlet. The housing inlet conduit may be coupled to a water supply such as tank or waterline. The housing may further include a gear assembly or a portion of the gear assembly.

The above embodiments merely express several embodiments of the present disclosure, and the descriptions thereof are more specific and detailed. It should not be understood as a limitation to the patent scope of the present disclosure. It should be noted that those of ordinary skill in the art may make a plurality of transformations and improvements without departing from the conception of the present disclosure. These transformations and improvements shall all fall within the protection scope of the present disclosure. Therefore, the scope of the present disclosure shall be subjected to the appended claims.

I claim:

1. A power supply system for a toilet, the power supply system comprising:
    a controller power supply circuit comprising:
        an input end electrically connected to an external power supply; and
        an output end;
    an assembly driving power supply circuit comprising:
        an input end electrically connected to the external power supply; and
        an output end;
    a controller circuit comprising:
        a power supply end electrically connected to the output end of the controller power supply circuit; and
        an output end communicably connected to a control end of a switch control circuit of the assembly driving power supply circuit; and
    a driving component circuit comprising:
        a power supply end electrically connected to the output end of the assembly driving power supply circuit,
    wherein an output power of the controller power supply circuit is lower than an output power of the assembly driving power supply circuit.

2. The power supply system for the toilet according to claim 1,
    wherein the controller power supply circuit further comprises a first switch power supply circuit, and
    wherein the first switch power supply circuit comprises:
        an input end electrically connected to the external power supply; and
        an output end electrically connected to the power supply end of the controller circuit.

3. The power supply system for the toilet according to claim 2,
    wherein the assembly driving power supply circuit further comprises a second switch power supply circuit connected in series to the switch control circuit,
    wherein the switch control circuit comprises:
        an input end electrically connected to the external power supply; and
        an output end electrically connected to an input end of the second switch power supply circuit,
    wherein the second switch power supply circuit comprises a first output end electrically connected to a first power supply end of the driving component circuit, and
    wherein an output voltage of the first output end of the second switch power supply circuit is higher than an output voltage of the first switch power supply circuit.

4. The power supply system for the toilet according to claim 3,
    wherein the assembly driving power supply circuit further comprises a direct current to direct current circuit,
    wherein the direct current to direct current circuit comprises:
        an input end electrically connected to a second output end of the second switch power supply circuit;
        an output end electrically connected to a second power supply end of the driving component circuit,
        wherein an output voltage of the output end of the direct current to direct current circuit is higher than the output voltage of the first switch power supply circuit.

5. The power supply system for the toilet according to claim 3,
    wherein the assembly driving power supply circuit further comprises a power factor correction circuit connected in series between the second switch power supply circuit and the switch control circuit.

6. The power supply system for the toilet according to claim 1,
    wherein the controller circuit comprises a controller,
    wherein the controller comprises:
        an input end of the controller communicably connected to an external sensor and/or an external key; and
        an output end communicably connected to the control end of the switch control circuit.

7. The power supply system for the toilet according to claim 6,
    wherein the controller is a micro controller unit.

8. The power supply system for the toilet according to claim 6,
    wherein the output end of the controller power supply circuit is electrically connected to a power supply end of the external sensor.

9. The power supply system for the toilet according to claim 8,
    wherein the controller circuit is configured to determine whether a user is using the toilet in response to a signal transmitted from the external sensor.

10. The power supply system for the toilet according to claim 9,
    wherein the controller circuit is further configured to turn off the switch control circuit in response to a determination that no user is using the toilet, and wherein the assembly driving power supply circuit is electrically disconnected to the external power supply when the controller circuit turns off the switch control circuit.

11. The power supply system for the toilet according to claim 9,
wherein the controller circuit is further configured to turn on the switch control circuit in response to a determination that the user is using the toilet, and
wherein the assembly driving power supply circuit is electrically connected to the external power supply when the controller circuit turns on the switch control circuit.

12. The power supply system for the toilet according to claim 1, further comprising a filter circuit,
wherein the input end of the controller power supply circuit is electrically connected to the external power supply through the filter circuit, and
wherein the input end of the assembly driving power supply circuit is electrically connected to the external power supply through the filter circuit.

13. The power supply system for the toilet according to claim 1,
wherein the switch control circuit comprises a triode,
wherein the triode comprises:
a collector electrically connected to the external power supply;
an emitter electrically connected to the second switch power supply circuit; and
a base, used as the control end of the switch control circuit, communicably connected to the output end of the controller circuit.

14. A method for supplying a power to a toilet, the method comprising:
supplying, by an external power supply, a power to a controller power supply circuit;
outputting a power, by the controller power supply circuit, to a controller circuit electrically connected to the controller power supply circuit;
determining, by the controller circuit, whether a user is using the toilet;
electrically connecting or disconnecting, by the controller circuit, an assembly driving power supply circuit to the external power in response to a determination of whether the user is using the toilet.

15. The method according to claim 14,
wherein the electrically connecting or disconnecting, by the controller circuit, the assembly driving power supply circuit to the external power comprises:
electrically disconnecting, by the controller circuit, the assembly driving power supply circuit to the external power in response to a determination that no user is using the toilet; and
electrically connecting, by the controller circuit, the assembly driving power supply circuit to the external power in response to a determination that the user is using the toilet.

16. The method according to claim 15, further comprising:
turning off, by the controller circuit, a switch control circuit to electrically disconnect the assembly driving power supply circuit to the external power; and
stopping, by the assembly driving power supply circuit, outputting a power to a driving component circuit electrically connected to the assembly driving power supply circuit when the switch control circuit is turned off.

17. The method according to claim 15, further comprising:
turning on, by the controller circuit, a switch control circuit to electrically connect the assembly driving power supply circuit to the external power; and
outputting, by the assembly driving power supply circuit, a power to a driving component circuit electrically connected to the assembly driving power supply circuit when the switch control circuit is turned on.

18. The method according to claim 17,
wherein the power output by the controller power supply circuit is lower than the power output by the assembly driving power supply circuit.

19. The method according to claim 14, further comprising:
outputting the power, by the controller power supply circuit, to an external sensor, the external sensor electrically connected to the controller power supply circuit and communicably connected to the controller circuit.

20. The method according to claim 19, further comprising:
transmitting, by the external sensor, to the controller circuit a signal indicating whether the user is present within a predetermined distance;
transmitting, by the external sensor, to the controller circuit a signal indicating whether the user is sitting on a toilet seat; or
transmitting, by the external sensor, to the controller circuit a signal indicating whether the user presses a button on a remote controller or an auxiliary key on a toilet bidet.

* * * * *